(12) United States Patent
Salem

(10) Patent No.: US 11,899,150 B2
(45) Date of Patent: Feb. 13, 2024

(54) VELOCITY MODEL FOR SEDIMENT-BASEMENT INTERFACE USING SEISMIC AND POTENTIAL FIELDS DATA

(71) Applicant: Saudi Arabian Oil Company, Dhahran (SA)

(72) Inventor: Ahmed Salem, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 128 days.

(21) Appl. No.: 17/586,911

(22) Filed: Jan. 28, 2022

(65) Prior Publication Data

US 2023/0243991 A1    Aug. 3, 2023

(51) Int. Cl.
  *G01V 1/34*    (2006.01)
  *G01V 1/30*    (2006.01)
  *G01V 1/18*    (2006.01)

(52) U.S. Cl.
  CPC .............. *G01V 1/345* (2013.01); *G01V 1/181* (2013.01); *G01V 1/303* (2013.01); *G01V 2210/1295* (2013.01); *G01V 2210/1429* (2013.01); *G01V 2210/6222* (2013.01); *G01V 2210/74* (2013.01)

(58) Field of Classification Search
  CPC ........ G01V 1/345; G01V 1/181; G01V 1/303; G01V 2210/1295; G01V 2210/1429; G01V 2210/6222; G01V 2210/74
  See application file for complete search history.

(56) References Cited

U.S. PATENT DOCUMENTS

| | | | |
|---|---|---|---|
| 5,754,493 | A | 5/1998 | Al-Chalabi |
| 7,525,874 | B2 | 4/2009 | Robinson et al. |
| 8,599,644 | B2 | 12/2013 | Bjerkholt |
| 11,048,001 | B2 * | 6/2021 | Zhang .................... G01V 1/282 |

(Continued)

FOREIGN PATENT DOCUMENTS

CA    2690954    8/2010

OTHER PUBLICATIONS

Brew et al., "Basement depth and sedimentary velocity structure in the northern Arabian platform, eastern Syria." Geophysical Journal International 128.3, Mar. 1997, 617-631, 15 pages.

(Continued)

*Primary Examiner* — Elias Desta
(74) *Attorney, Agent, or Firm* — Fish & Richardson P.C.

(57) ABSTRACT

A process for generating a velocity model for a sediment-basement interface of a subsurface region includes receiving seismic data representing acoustic signals that are reflected from regions of the subsurface. The process includes receiving potential fields data comprising potential field values that are mapped to locations in the subsurface. The process includes generating weighted time-depth data pairs. The process includes selecting a velocity model that relates a velocity value to a depth value in a time-depth relationship. The process includes optimizing velocity coefficients of the velocity model by determining, for each velocity model of a set, a set of depth estimates for corresponding time values and comparing the set of depth estimates to depth values of the weighted time-depth data pairs. The process includes adjusting the velocity coefficients of the velocity model. The process includes generating a seismic image of the sediment-basement interface.

20 Claims, 9 Drawing Sheets

(56) References Cited

U.S. PATENT DOCUMENTS

| | | | |
|---|---|---|---|
| 11,709,288 B2* | 7/2023 | Asgedom | G01V 1/306 |
| | | | 702/16 |
| 2023/0184972 A1* | 6/2023 | Colombo | G01V 1/306 |
| | | | 367/73 |

OTHER PUBLICATIONS

Epuh et al., "Basement Depth and Sedimentary Velocity Structure in Gongola Basin." Journal of Geology & Geophysics 6, 285, Mar. 2017, 9 pages.

Koketsu et al., "Joint inversion of refraction and gravity data for the three-dimensional topography of a sediment-basement interface." Geophysical Journal International 151.1, Oct. 2002, 243-254, 12 pages.

* cited by examiner

VELOCITY MODEL FOR SEDIMENT-BASEMENT INTERFACE USING SEISMIC AND POTENTIAL FIELDS DATA

TECHNICAL FIELD

The present specification generally relates to an approach for identifying geologic features in a subterranean formation.

BACKGROUND

Hydrocarbons, such as oil and gas, occur in the Earth's subsurface at a depth ranging from a few hundred meters to several kilometers and are found in geological formations, which are layers of rock. As such, prospecting for hydrocarbons includes the difficult tasks of identification of where such geological formations exist and extraction of the hydrocarbons from these geological formations at such depths. Identifying the location of hydrocarbons may include the conducting of geophysical surveys collected through, for example, seismic prospecting. These geophysical surveys can be employed to construct geological maps representing the structure of areas of the outer crust of the Earth.

SUMMARY

The present specification describes systems and processes for generating a velocity model that describes a sediment-basement interface. A computing system generates the velocity model based on inputs including seismic data and potential fields data. The seismic data includes acoustic data that are generated by an acoustic source and received by one or more receivers in a subsurface. The potential fields data are gathered based on surveying potential fields in order to obtain structural information of the subsurface to characterize layers in the subsurface in terms of physical and geological properties. Examples of potential fields data include gravimetry, magnetometry and electromagnetic data that are mapped to locations in the subsurface.

A data processing system generates the velocity model to enable more accurate modeling of the sediment-basement interface. The sediment-basement interface includes a region of the subsurface defining a border between sediment layers of the subsurface and a basement layer of the subsurface. A basement layer includes rock (e.g., granite or other such rock) that is below a sedimentary cover or sedimentary platform, which include sedimentary rocks or sedimentary basins. The sedimentary layers include sediments or sedimentary rock formed by deposits of organic or mineral particles.

A data processing system generates the velocity model as described herein. In a first process, the data processing system performs an estimation of coefficients for a velocity function that models a time-depth relationship for seismic data at the sediment-basement interface from weighted time-depth data points that are derived from available interpretation of surface seismic and potential fields data. In a second example, the data processing system performs an estimation of the coefficients for a velocity function based on time-depth data from single or multiple wells and/or from velocity analysis of surface seismic data. The systems can use the generated velocity model as a precise estimation for both time-depth conversions and depth imaging of the sediment-basement interface.

The implementations described herein enable one or more of the following advantages. Classical techniques for creating velocity models often depend on seismic velocity analysis of surface seismic data and/or time-depth data from wells. Velocities derived from these techniques are considered reliable and acceptable in shallow sedimentary sections. However, velocities derived from these techniques are inaccurate for imaging the sediment-basement interface. This is because most wells do not penetrate basement structures and resolution and sensitivity of the velocities estimated from the surface data deteriorates. To provide an additional control in seismic depth imaging and time to depth conversion process, depth estimates from potential fields data can be used as a guide for selecting a correct seismic velocity for sediment-basement interface. The processes described in this specification enable the data processing system to perform depth-to-basement estimates from interpretation of potential fields data and perform time estimates based on interpretation of surface seismic data. The data processing system, based on the depth and time estimates, determines coefficients of a velocity model for sediment-basement interface. The data processing system integrates this time-depth information with time-depth information from a velocity analysis of surface seismic data and/or time-depth data from wells to estimate coefficients of a velocity function for the sediment-basement interface.

The generated velocity model enable an improved estimate for the coefficients of the velocity model. The improved velocity model enhances generated seismic images relative to seismic images developed from surface seismic data. The improved velocity model enhances the accuracy of time-depth conversion for basement interface. The depth-time controls improve the estimation of the velocity coefficients.

Each of these advantages are enabled by one or more of the following embodiments.

In a general aspect, a process for generating a velocity model for a sediment-basement interface of a subsurface region includes the following. The process includes receiving seismic data representing acoustic signals that are reflected from regions of the subsurface. The process includes receiving potential fields data comprising potential field values that are mapped to locations in the subsurface. The process includes based on the potential fields data and seismic data, generating weighted time-depth data pairs. The process includes selecting a velocity model that relates a time value to a depth value in a time-depth relationship. The process includes optimizing velocity coefficients of the velocity model by: accessing a set of velocity models; determining, for each velocity model, a set of depth estimates for corresponding time values; comparing the set of depth estimates to depth values of the weighted time-depth data pairs; and based on the comparing, adjusting the velocity coefficients of the velocity model, wherein adjusting the velocity coefficients reduces a difference between the depth estimates and the depth values of the weighted time-depth pairs. The process includes generating, using the velocity model having the optimized coefficients, a seismic image of the sediment-basement interface.

In some implementations, comparing the set of depth estimates to depth values of the weighted time-depth data pairs comprises construction of a visual displaying of a discrepancy map.

In some implementations, comparing the set of depth estimates to depth values of the weighted time-depth data pairs comprises measuring of an objective function in a parameters space using a set of model candidates.

In some implementations, the potential fields data comprise at least two of gravimetry data, magnetometry data, and electromagnetic data.

In some implementations, the process includes receiving well time-depth data from sensors in one or more wells; and based on well time-depth data, estimating the coefficients of the velocity model.

In some implementations, the time-depth relationship is based on a two-way-time (TWT) to a given layer comprising the depth value.

In some implementations, comparing the set of depth estimates to depth values of the weighted time-depth data pairs comprising performing a Bisquare least squares method.

In a general aspect, a system for generating a velocity model for a sediment-basement interface of a subsurface region includes the following. The system includes at least one processor. The system includes a memory storing instructions that, when executed by the at least one processor, cause the at least one processor to perform operations. The operations include receiving seismic data representing acoustic signals that are reflected from regions of the subsurface. The operations includes receiving potential fields data comprising potential field values that are mapped to locations in the subsurface. The operations includes based on the potential fields data and seismic data, generating weighted time-depth data pairs. The operations includes selecting a velocity model that relates a velocity value to a depth value in a time-depth relationship. The operations includes optimizing velocity coefficients of the velocity model by: accessing a set of velocity models; determining, for each velocity model, a set of depth estimates for corresponding time values; comparing the set of depth estimates to depth values of the weighted time-depth data pairs; and based on the comparing, adjusting the velocity coefficients of the velocity model, wherein adjusting the velocity coefficients reduces a difference between the depth estimates and the depth values of the weighted time-depth pairs. The operations includes generating, using the velocity model having the optimized coefficients, a seismic image of the sediment-basement interface.

One or more non-transitory computer readable media storing instructions for generating a velocity model for a sediment-basement interface of a subsurface region, the instructions, when executed by at least one processor, configured to cause the at least one processor to perform operations. The operations include receiving seismic data representing acoustic signals that are reflected from regions of the subsurface. The operations includes receiving potential fields data comprising potential field values that are mapped to locations in the subsurface. The operations includes based on the potential fields data and seismic data, generating weighted time-depth data pairs. The operations includes selecting a velocity model that relates a velocity value to a depth value in a time-depth relationship. The operations includes optimizing velocity coefficients of the velocity model by: accessing a set of velocity models; determining, for each velocity model, a set of depth estimates for corresponding time values; comparing the set of depth estimates to depth values of the weighted time-depth data pairs; and based on the comparing, adjusting the velocity coefficients of the velocity model, wherein adjusting the velocity coefficients reduces a difference between the depth estimates and the depth values of the weighted time-depth pairs. The operations includes generating, using the velocity model having the optimized coefficients, a seismic image of the sediment-basement interface.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The details of one or more embodiments are set forth in the accompanying drawings and the description below. Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

This disclosure describes data processing systems and processes for generating a velocity model from data including depth estimates from interpretation of potential fields data and time estimates from interpretation of surface seismic data. The data processing systems and processes define parameters for a velocity function for time-depth conversion and depth imaging of a sediment-basement interface.

Figure 1:
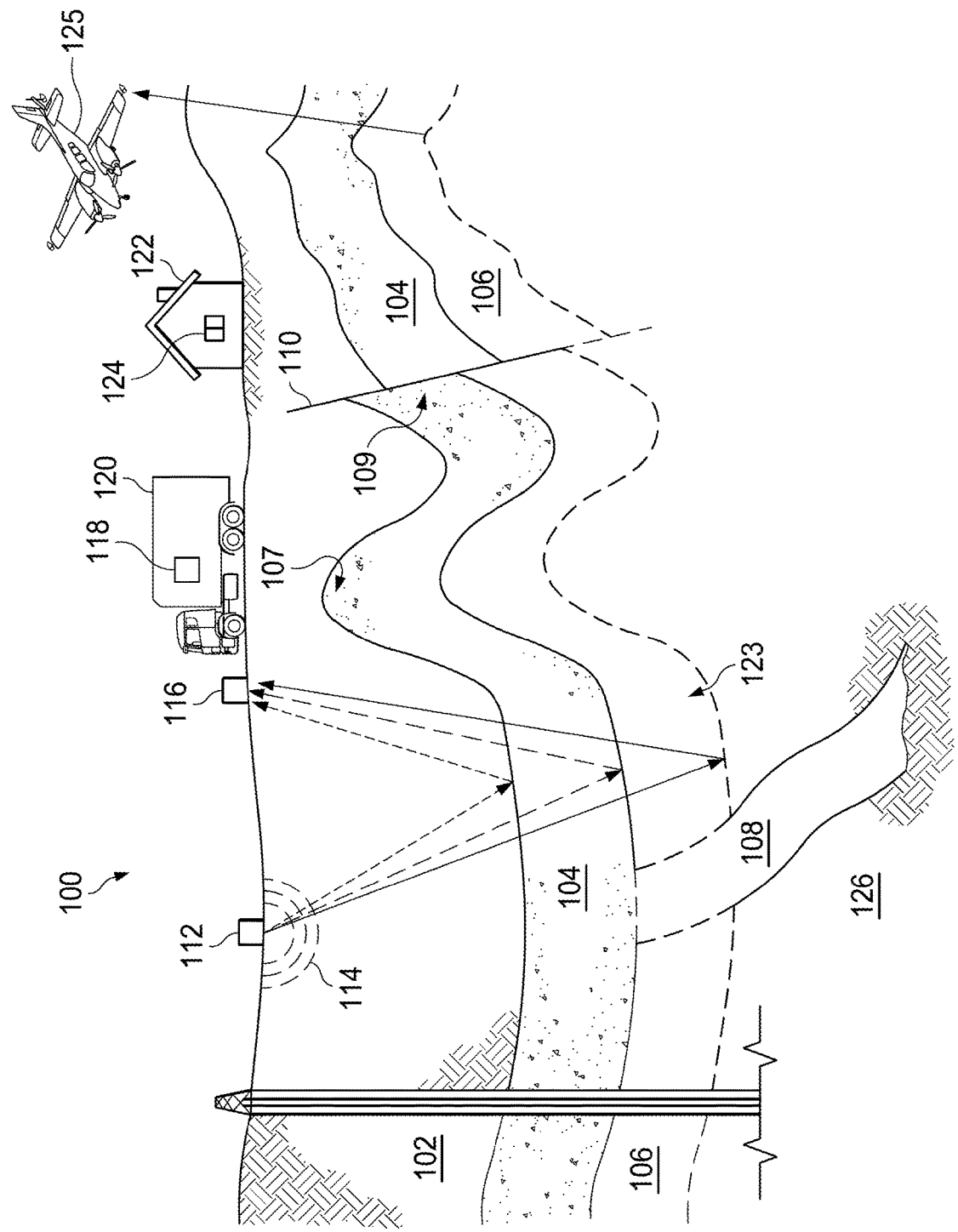
FIG. 1 is a schematic view of seismic and potential fields surveys being performed to map subterranean features such as facies, faults, and layers.

FIG. 1 is a schematic view of a seismic survey being performed to map subterranean features such as facies and faults in a subterranean formation 100. The seismic survey can provide the underlying basis for implementation of the systems and methods described herein. The subterranean formation 100 includes a layer of impermeable cap rocks 102 at the surface. Facies underlying the impermeable cap rocks 102 include a sandstone layer 104, a limestone layer 106, and a sand layer 108. A fault line 110 extends across the sandstone layer 104 and the limestone layer 106.

Oil and gas tend to rise through permeable reservoir rock until further upward migration is blocked, for example, by the layer of impermeable cap rock 102. Seismic surveys attempt to identify locations where interaction between layers of the subterranean formation 100 are likely to trap oil and gas by limiting this upward migration. For example, FIG. 1 shows an anticline trap 107, where the layer of impermeable cap rock 102 has an upward convex configuration, and a fault trap 109, where the fault line 110 might allow oil and gas to flow along with clay material between the walls traps the petroleum. Other traps include salt domes and stratigraphic traps.

A seismic source 112 (for example, a seismic vibrator or an explosion) generates seismic waves 114 that propagate in the earth. The velocity of these seismic waves depends on several properties, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 100, the velocity of seismic waves traveling through the subterranean formation 100 will be different in the sandstone layer 104, the limestone layer 106, and the sand layer 108. As the seismic waves 114 contact interfaces between geologic bodies or layers that have different velocities, the interfaces reflect some of the energy of the seismic wave and refracts some of the energy of the seismic wave. Such interfaces are sometimes referred to as horizons.

The seismic waves 114 are received by a sensor or sensors 116. Although illustrated as a single component in FIG. 1, the sensor or sensors 116 are typically a line or an array of sensors 116 that generate output signals in response to received seismic waves including waves reflected by the horizons in the subterranean formation 100. The sensors 116 can be geophone-receivers that produce electrical output signals transmitted as input data, for example, to a computer 118 on a seismic control truck 120. Based on the input data, the computer 118 may generate a seismic data output, for example, a seismic two-way response time plot.

A control center 122 can be operatively coupled to the seismic control truck 120 and other data acquisition and wellsite systems. The control center 122 may have computer facilities for receiving, storing, processing, and analyzing data from the seismic control truck 120 and other data acquisition and wellsite systems. For example, computer systems 124 in the control center 122 can be configured to analyze, model, control, optimize, or perform management tasks of field operations associated with development and production of resources such as oil and gas from the subterranean formation 100. Alternatively, the computer systems 124 can be located in a different location than the control center 122. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 124 may be displayed for user viewing using local or remote monitors or other display units. One approach to analyzing seismic data is to associate the data with portions of a seismic cube representing the subterranean formation 100. The seismic cube can also be display results of the analysis of the seismic data associated with the seismic survey.

A basement sediment interface 123 is mapped by the computer system 124. A magnetic method is one example of a potential fields technique for mapping the basement-sediment interface 123. This is because sediment rocks have low magnetic susceptibility compared to those of the basement rocks. Potential fields surveys can take place on land, airborne sensors supported by a plane 125, and using marine sensors (not shown). Airborne acquisition of potential fields data is the most common in oil and gas exploration. The resolution depends on flight line spacing and a flight altitude of the plane 125.

Figure 2:
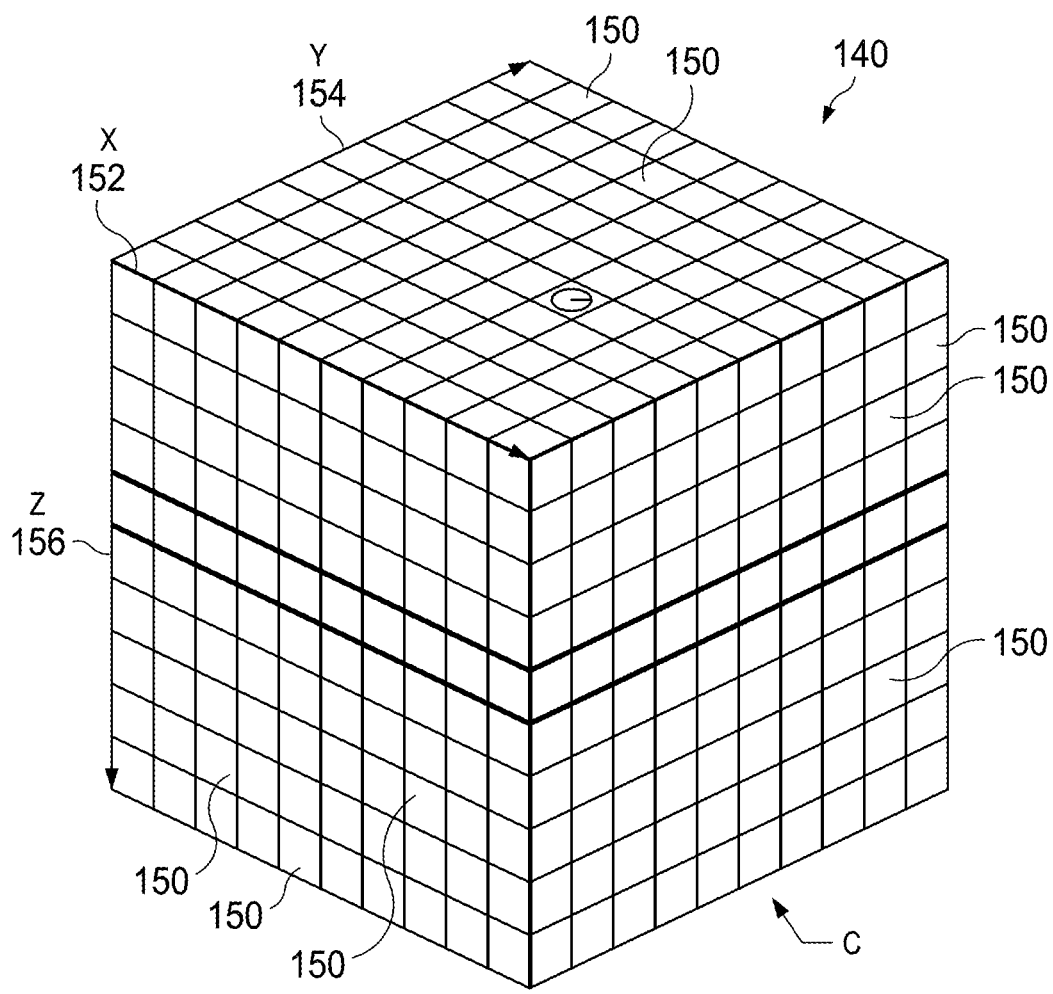
FIG. 2 illustrates a three-dimensional cube representing a subterranean formation.

FIG. 2 illustrates a seismic cube 140 representing at least a portion of the subterranean formation 100. The seismic cube 140 is composed of a number of voxels 150. A voxel is a volume element, and each voxel corresponds, for example, with a seismic sample along a seismic trace. The cubic volume C is composed along intersection axes of offset spacing times based on a delta-X offset spacing 152, a delta-Y offset spacing 154, and a delta-Z offset spacing 156. Within each voxel 150, statistical analysis can be performed on data assigned to that voxel to determine, for example, multimodal distributions of travel times and derive robust travel time estimates (according to mean, median, mode, standard deviation, kurtosis, and other suitable statistical accuracy analytical measures) related to azimuthal sectors allocated to the voxel 150.

Figure 3:
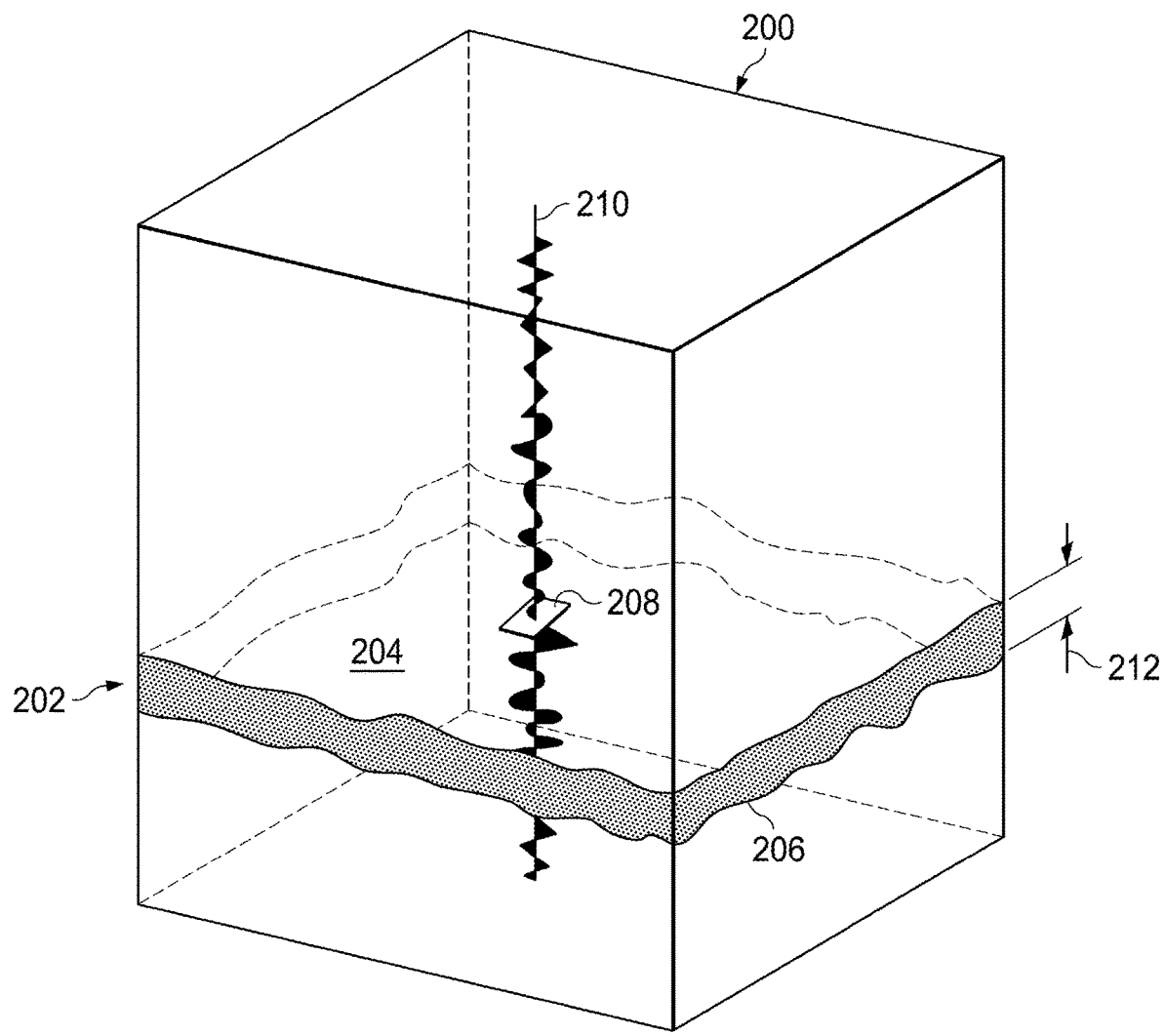
FIG. 3 illustrates a stratigraphic trace within the three-dimensional cube of FIG. 2.

FIG. 3 illustrates a seismic cube 200 representing a formation. The seismic cube has a stratum 202 based on a surface (for example, amplitude surface 204) and a stratigraphic horizon 206. The amplitude surface 204 and the stratigraphic horizon 206 are grids that include many cells such as exemplary cell 208. Each cell is a seismic trace representing an acoustic wave. Each seismic trace has an x-coordinate and a y-coordinate, and each data point of the trace corresponds to a certain seismic travel time or depth (t or z). For the stratigraphic horizon 206, a time value is determined and then assigned to the cells from the stratum 202. For the amplitude surface 204, the amplitude value of the seismic trace at the time of the corresponding horizon is assigned to the cell. This assignment process is repeated for all of the cells on this horizon to generate the amplitude surface 204 for the stratum 202. In some instances, the amplitude values of the seismic trace 210 within window 212 by horizon 206 are combined to generate a compound amplitude value for stratum 202. In these instances, the compound amplitude value can be the arithmetic mean of the positive amplitudes within the duration of the window, multiplied by the number of seismic samples in the window.

Figure 4:
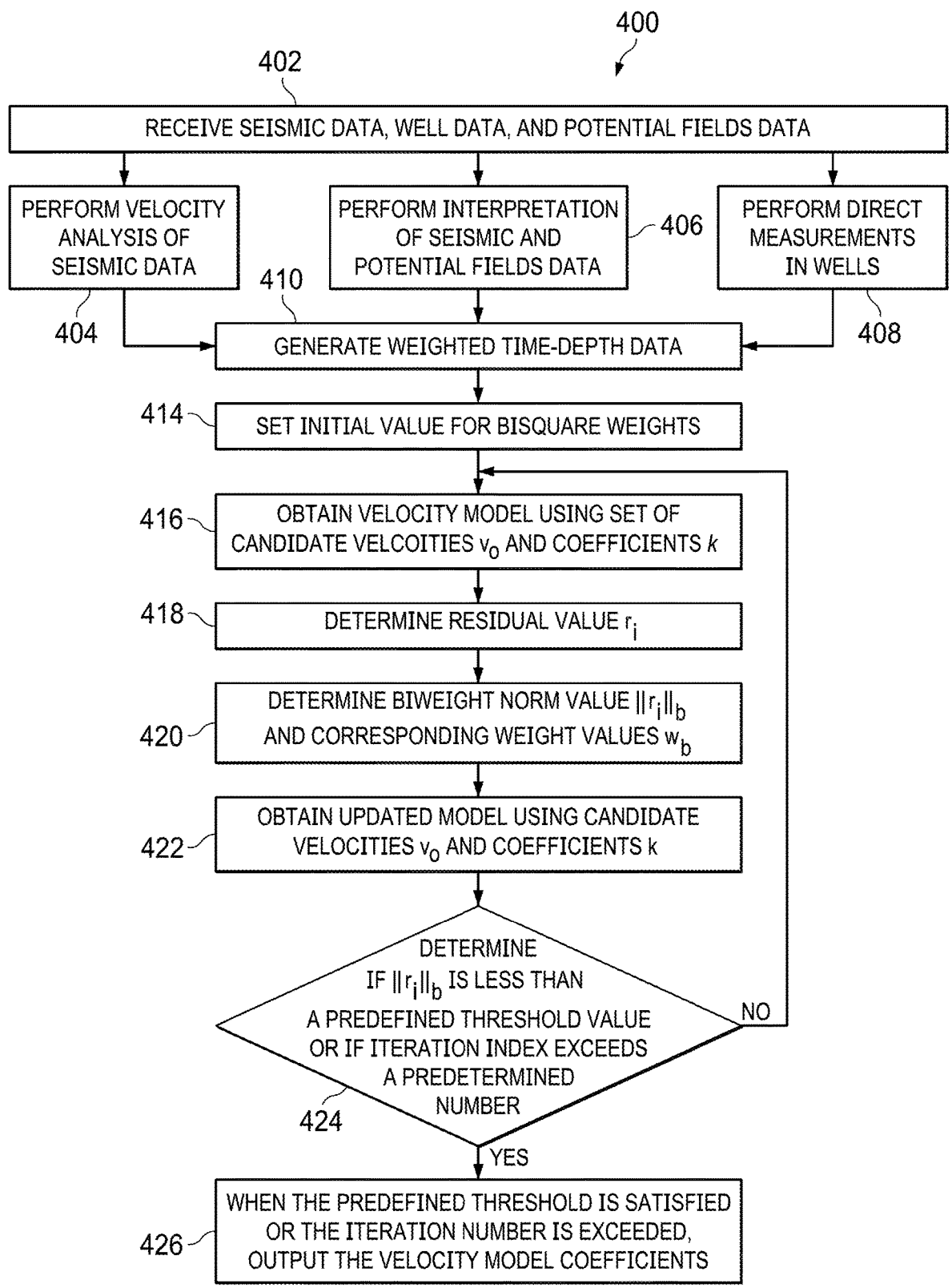
FIG. 4 is a flowchart of an example of a process for generating a velocity model that describes a sediment-basement interface.

FIG. 4 is a flowchart of an example of a process 400 for generating a velocity model that describes a sediment-basement interface. The process 400 can be performed by a data processing system, such as the computing system described in relation to FIG. 9, or the computer system 124 described in relation to FIG. 1. The data processing system determines the depth of the sediment-basement interface by interpreting potential fields data. The data processing system performs a time data estimate for signals from the interface based on surface seismic data. The data processing system uses the surface seismic data and potential fields data to define parameters for a velocity function for each of time-depth conversion velocity modeling and depth imaging of the sediment-basement interface. Additional time-depth data can be used based on velocity analysis of surface seismic data and/or time-depth data obtained directly from wells such as check shots.

As previously described, the sediment-basement interface 123 includes a region of the subsurface defining a border between sediment layers (e.g., layer 102, 104, 106) of the subsurface and basement layer 126, shown in FIG. 1. The basement layer 126 includes rock (e.g., granite or other such rock) that is below a sedimentary cover or sedimentary platform, which include sedimentary rocks or sedimentary basins. The sedimentary layers 102, 104, 106 include sediments or sedimentary rock formed by deposits of organic or mineral particles.

The data processing system generates the velocity model using the pair of weighted time-depth data. In a first process, the data processing system performs an estimation of coefficients for a velocity function that models a time-depth relationship for seismic data at the sediment-basement interface from weighted data points that are derived from interpretation of surface seismic and potential fields data and from analysis of surface seismic data and/or from well data if they are available. The seismic data includes acoustic data that are generated by an acoustic source and received by one or more receivers in a subsurface, as described in relation to FIGS. 1-3. The potential fields data are gathered based on surveying potential fields in order to obtain structural information of the subsurface to characterize layers in the subsurface in terms of physical and geological properties. Examples of potential fields data include gravimetry, magnetometry and electromagnetic data that are mapped to locations in the subsurface.

The data processing system performs an estimation of the coefficients for a velocity function based on time-depth data from single or multiple wells and/or from velocity analysis of surface seismic data. The systems can use the generated velocity model as a precise estimation for both time-depth conversions and depth imaging of the sediment-basement interface.

To perform the estimation, the data processing system is configured to execute an analytic velocity function. The analytic velocity function includes an instantaneous velocity and a linear increase with depth according to Equation (1).

$$v_z = v_0 + kz \quad (1)$$

where $v_0$ is the instantaneous velocity at a depth $z=0$, and where k is a rate of increase of velocity with depth (called a compaction factor).

Equation (1) has a depth-time relation for a single layer according to Equation (2).

$$z = \frac{v_0}{k}\left(e^{0.5kT} - 1\right) \quad (2)$$

where z is the depth and T is a two-way-time (TWT) to the layer.

Figure 6:
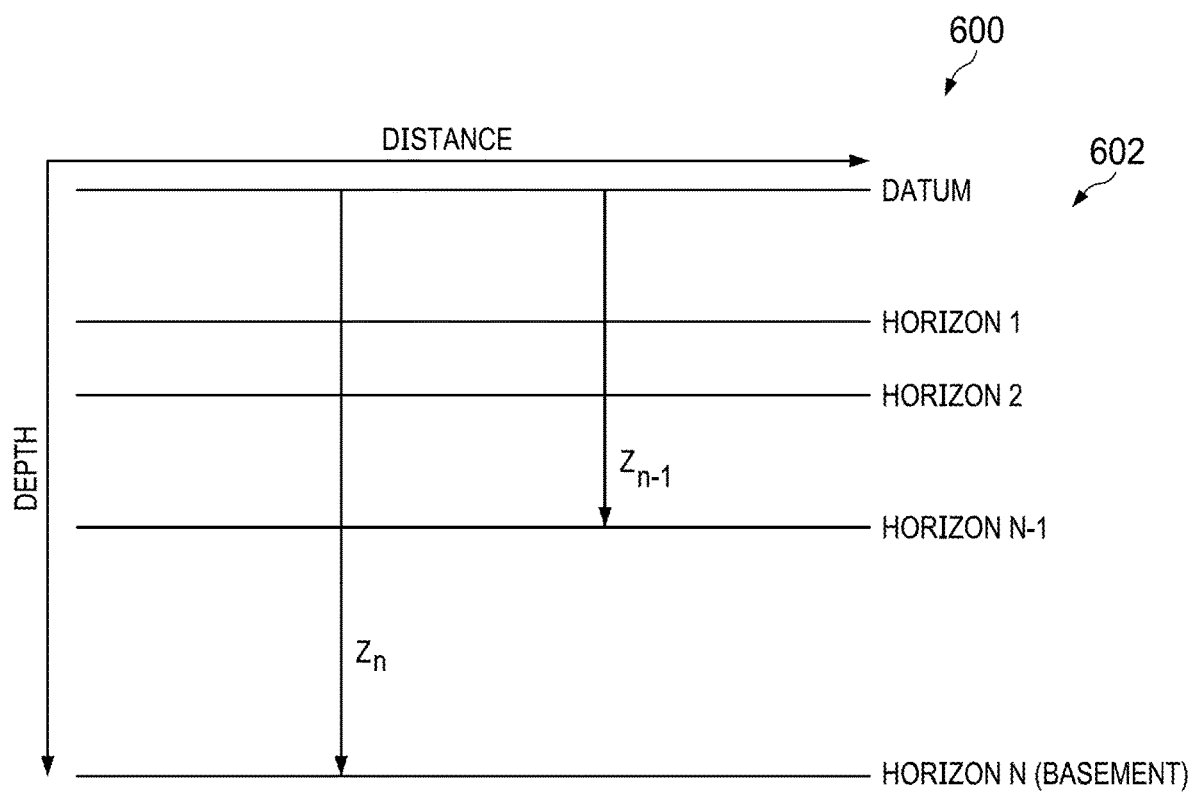
FIG. 6 illustrates examples of time and depth data for generating a velocity model that describes a sediment-basement interface.
Figure 6:
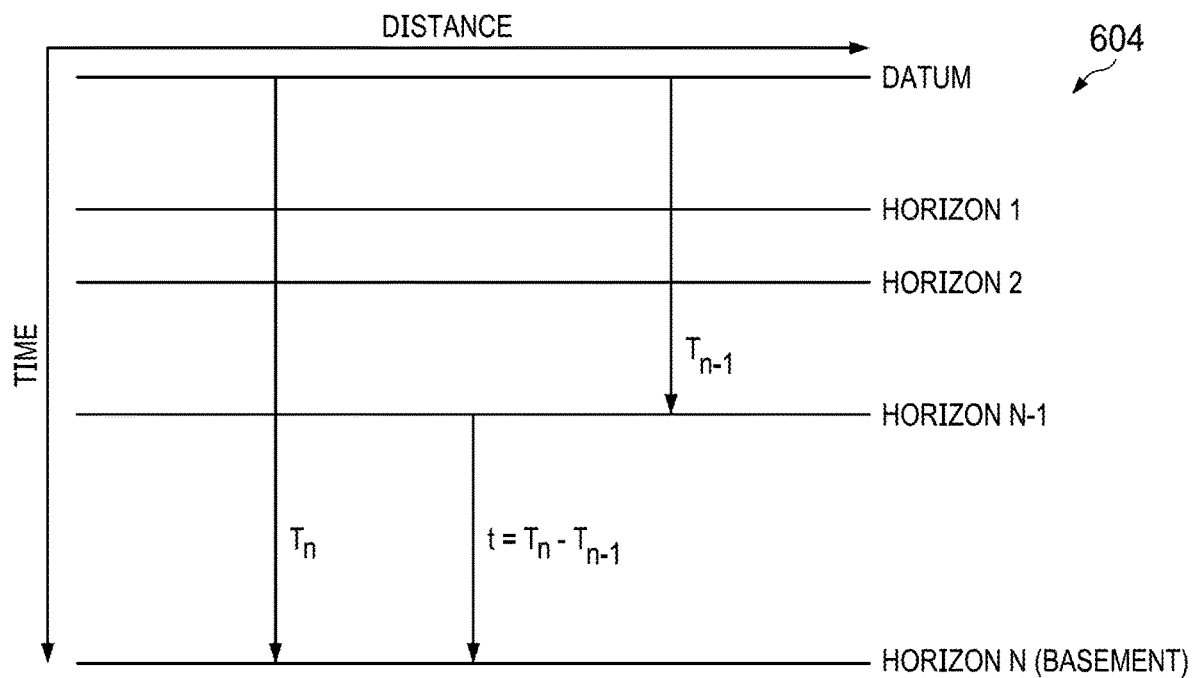

For multilayers, the depth-time relation is defined according to Equation (3).

$$z_n = \frac{v_0}{k}\left(e^{kt} - 1\right) + z_{n-1}e^{kt} \quad (3)$$

where $z_n$ where is the depth to the sediment-basement interface and $z_{n-1}$ is a depth to the deepest interpreted top sedimentary layer, as described in relation to FIG. 6, graph 602. The parameter t represents an interval time from a deepest sedimentary layer top to a basement top, described in relation to FIG. 6, graph 604. The corresponding TWT for the sediment-basement interface is defined according to Equation (4).

$$T_n = T_{n-1} + 2\log\left(\frac{z_n + \frac{v_0}{k}}{z_{n-1} + \frac{v_0}{k}}\right)/k \quad (4)$$

The data processing system is configured to optimize the velocity coefficients ($v_0$ and k) from the estimation of time t based on interpretation of surface seismic data and the estimation of depth to basement top $z_n$ from interpretation of potential fields data. There are different optimization techniques can be used to obtain the unknown parameters $v_0$ and k, as now described. One of these techniques depends on using a set of models ($m_c$) each model defined by the parameter values $v_0$ and k and calculate a set of depth estimates $\bar{z}_n(m_c)$. This set of depth estimates are compared with the actual values of $z_n$ from potential fields data through construction of visual displaying of the discrepancy map or measuring of an objective function in a parameter space using a set of candidates ($m_c$). Equation (5) describes the comparison of depth estimates $\bar{z}_n(m_c)$ to the actual depth values $z_n$.

$$\|r\| = \|(z_n - \bar{z}_n(m_c)\| \quad (5)$$

where r represents the distance between the actual depth $z_n$ values from potential fields data and the estimated depth $\bar{z}_n(m_c)$ from the interpreted time using seismic data and the candidate parameters $v_0$ and k (Equation 3).

The data processing system is configured for numerical optimization of finding solutions that minimizes Equation (5) or visually, by computing the distance $\|r\|$ for each parameter spaces of $v_0$ and k and then displaying the distance $\|r\|$ in a map in which $v_0$ and k are the x and y coordinates. The model parameters that give minimum distance $\|r\|$ are selected. An advantage of the visual map display approach is that a range of parameters space is constrained and designed by the data processing system. In addition, numerical techniques are comparably fast with respect to the visual map display approach. Numerical approaches can deal with outliers such as Tukey's Biweight (e.g., Bisquare weight).

The data processing system combines the visual map approach and the numerical approach in one process 400 to optimize the coefficients of the velocity for the sediment-basement interface. For process 400, the data processing system executes a velocity modeler routine. The velocity modeler routine receives (402) weighted time-depth data from interpretation of surface seismic images and potential fields data for the sediment-basement interface Obtaining this data can include performing (404) velocity analysis of seismic data, performing (406) interpretation of seismic and potential fields data, and performing (408) direct measurements in wells. These data are combined by the data processing system into generated (410) weighted time-depth data. The weights for the time-depth data are predefined by the user. A weight value ($w_u$) between 0 and 1 is assigned to each pair of time-depth data describing the confidence and importance of each pair. For example, if the confidence of a pair of time-depth data is high, the user may assign higher value for the weight close to 1. Vice versa when the confidence of the time-depth pair is low, small weight values close to zero may be assigned. Two types of weights can be used. A first type of weight is a user-defined weight where the user assigns weights for each time-depth pair depending on the confidence of how the pair of data is obtained. A second type of weight includes Bisquare weights which are updated by an iterative approach to exclude outliers. In some implementations, time-depth data from wells or directly from a velocity analysis of surface seismic data, when available, are weighted and combined (410) with the weighted time-depth data. Once the user-defined weights ($w_u$) are assigned, they remain constant in the processing system.

The time-depth data represent the time and depth to a deepest interpreted sedimentary top, the time interval between a basement top and the deepest interpreted sedimentary top obtained from interpretation of surface seismic images and the depth to basement top. The depth to the basement top is obtained from interpretation of potential fields data such as magnetic, gravity, and/or electromagnetic data.

The data processing system sets (414) an initial value for the Bisquare weights ($w_b$). Bisquare and Biweight refer to an extension of the least squares method that removes or down-weights extreme outliers. The data processing system reweights the time-depth data based on an iterative reweighted least squares method, in which the data processing system minimizes a Biweight norm. In each iteration, the data processing system selects model parameters that give minimum discrepancy. Unlike the user-defined weights ($w_u$), the Bisquare weights ($w_b$) are updated. The data processing system determines a new set of Bisquare weights for use in the subsequent iteration.

Once the data processing system prepares the weighted time-depth data. The data processing system estimates the model parameters. The data processing system sets the Bisquare weights $w_b$ to an initial value of one. The data processing system obtains (416) an initial model ($m_0$) from a range of model candidates ($m_c$). The data processing system selects the model that minimizes the weighted residuals as shown in Equation (6).

$$r_w = \|w_b w_u z_n - w_b w_u \bar{z}_n(m_c)\| = \min \quad (6)$$

where $w_u$ is a predefined weight and $w_b$ is the Bisquare weight. For a current iteration (i), the data processing system determines (418) a current residual ($r_i$) for the previous model $m_{i-1}$ using Equation (7).

$$r_i = w_u z_n - w_u \bar{z}_n(m_{i-1}) \quad (7)$$

Using the current residual ($r_i$), the Biweight norm $\|r_i\|_b$ and the corresponding weights $w_b$ are calculated (420) as shown in Equation (8) and Equation (9).

$$\|r_i\|_b = \sum_i \begin{cases} \frac{\varepsilon^2}{6} & |r_i| > \varepsilon \\ \frac{\varepsilon^2}{6}\{1 - [1 - (r_i/\varepsilon)^2]^3\} & |r_i| \le \varepsilon \end{cases}, \text{ and} \quad (8)$$

$$w_b = \begin{cases} 0 & |r_i| > \varepsilon \\ [1 - (r_i/\varepsilon)^2]^2 & |r_i| \le \varepsilon \end{cases} \quad (9)$$

where $\varepsilon = 4.685 \times MAD/0.6745$, and where MAD represents median absolute deviation.

The data processing system obtains (422) a current (updated) model ($m_i$) from a range of candidate models ($m_c$) that minimizes the weighted residuals using Equation (6). The data processing system determines (424) the iteration (i) exceeds a threshold number or whether the Biweight norm $\|r_i\|_b$ is less than a threshold value. If the iteration exceeds the threshold number, the data processing system outputs (426) the velocity model coefficients $v_0$ and k. Otherwise, the data processing system performs additional iterations of steps 416, 418, 420, and 422.

The data processing system, using the estimates of $v_0$ and k, determines time and depth values from the input time-depth data using Equations (3) and (4). The data processing system identifies locations of the outliers from the final Bisquare weights and the comparison of the converted time and depth with the original input data.

Figure 5:
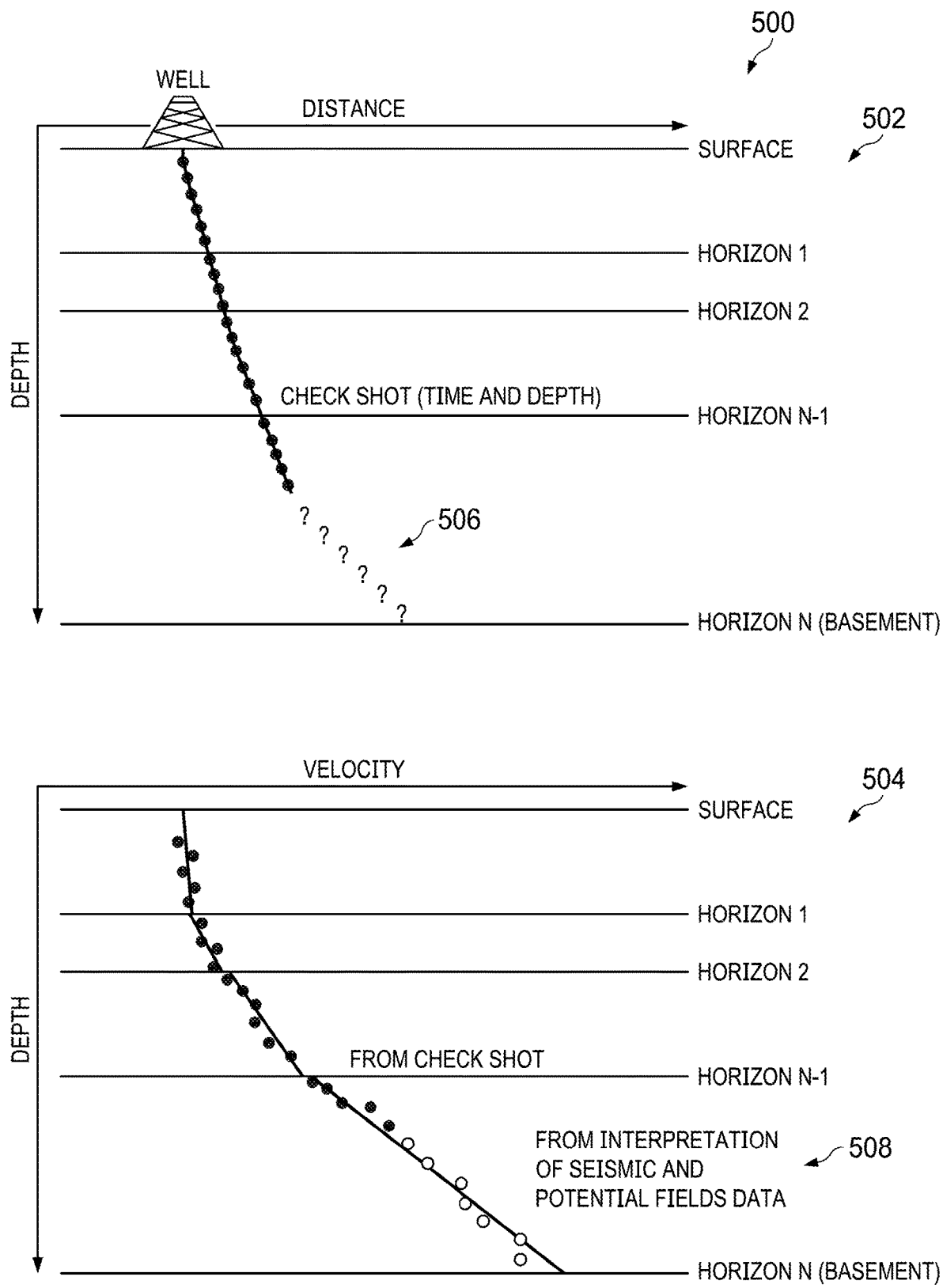
FIG. 5 illustrates a comparison of velocity models from well data only and using seismic data and potential fields data.

FIG. 5 illustrates graphs 500 showing a comparison of velocity models from well data only and using seismic data and potential fields data. In graph 502, time-depth data are show that are acquired based on well data. No data for region 506 are available from well data alone. Region 506 is the region between the well (e.g., downhole sensors) and the horizon or basement surface. In contrast, in graph 504, velocity-depth data are shown in which region 508 is populated using the potential fields data and the surface seismic data, as previously described. Region 508 is the region between downhole sensors and the surface of the basement. In graph 504, a more accurate estimate of the time-depth data are acquired relative to the extrapolated data of graph 502.

FIG. 6 illustrates example data 600 including time and depth data for generating a velocity model that describes a sediment-basement interface. Graph 602 shows a depth to the sediment-basement interface. $Z_{n-1}$ is the depth to the deepest interpreted top sedimentary layer, and $z_n$ is the depth to the sediment-basement interface. In graph 604, T represents the corresponding time interval from the sedimentary basement layer to the basement top. Equation (4) represents the relationship between Z and T for the subsurface, as previously described.

Figure 7:
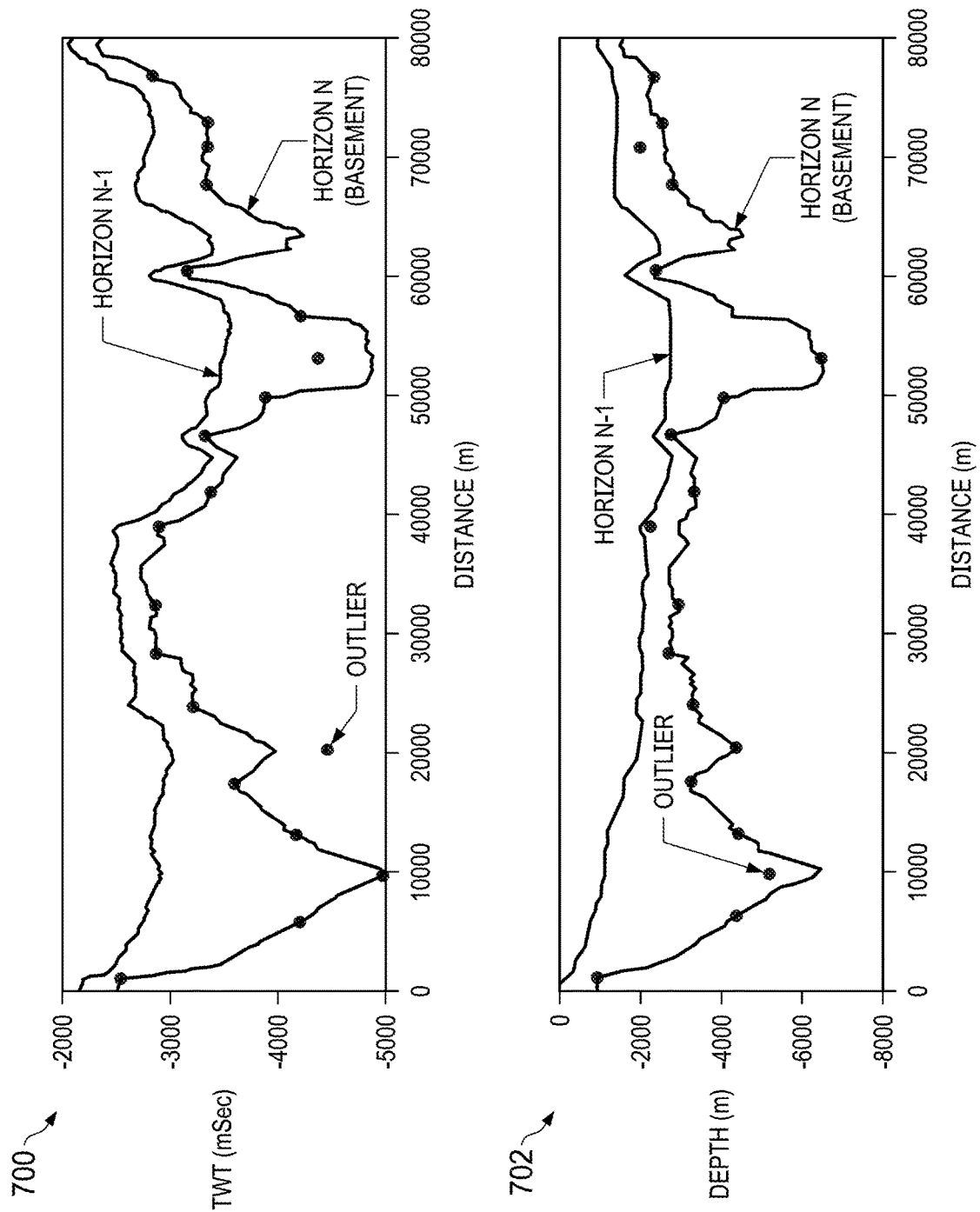
FIG. 7 illustrates examples of modeling the sedimentary-basement interface using time and depth data.

FIG. 7 illustrates example models 700, 702 of the sedimentary-basement interface using time and depth data. The data processing system generates the models for graphs 700, 702 using the process 400. In these examples, the process 400 is demonstrated using a synthetic time-depth data. Graph 700 shows a two way time (TWT) interpretation of the deepest sedimentary layer (horizon n−1) and the top of basement and depth to the horizon n. The data are generated from interpretation of surface seismic and well data.

The graph 702 shows a depth to sediment-basement interface that the data processing system determines based on Equation (3) with velocity parameters ($v_0$=4000 m/sec and k=0.3 sec$^{-1}$). The data processing system uses 20 data points that are extracted from the modeled data. In graphs 700 and 702, black circles in the time and depth space, respectively, are shown. In this example, all data points are equally weighted ($w_u$=1). In this example, 5 data points were shifted. Three of the shifted data points are in the depth domain and the other two are in time domain. The shift is to simulate outliers in the time-depth data set. In addition, Gaussian random noise with zero mean and a standard deviation of 2% are added to all time and depth data.

Figure 8:
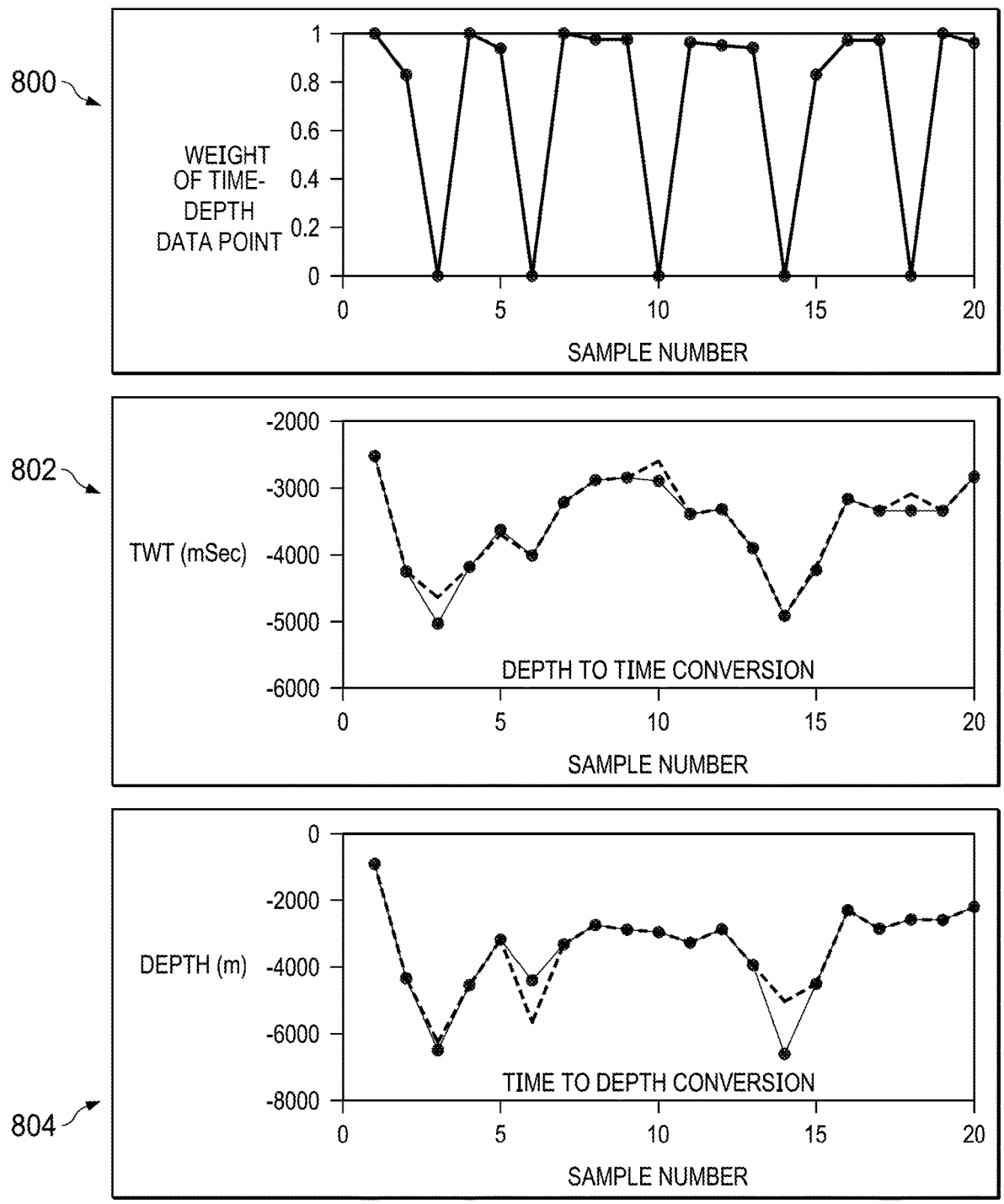
FIG. 8 illustrates examples of depth to time and time to depth conversions for generating a velocity model that describes a sediment-basement interface.

FIG. 8 illustrates graphs showing depth to time and time to depth conversions for generating a velocity model that describes a sediment-basement interface using the presented method. All outlier data were detected and excluded to provide model parameters ($v_0$=4088 m/sec and k=0.25). Graph 800 shows results of weighting the data points. Graph 802 displays the TWT data produced by the depth data and the estimated parameters of the velocity model. Comparison of the interpreted TWT data (dashed line) and the TWT obtained from the conversion of the depth data (black circles) identifies the locations of the interpreted depth data that need correction. Graph 804 shows the depth obtained from the time data and the estimated parameters. The locations of the outliers data in the time interpretation are identified by comparing the depth (dash red line) obtained from potential fields data and the depth obtained from the conversion of the TWT data (black circles). The data processing system estimates velocity parameters for the basement and also determines outliers in the input data. Interpretation can be revised to enhance the quality of estimating the velocity parameters. The velocity parameters are used to generate seismic images and perform direct time-depth conversion.

Figure 9:
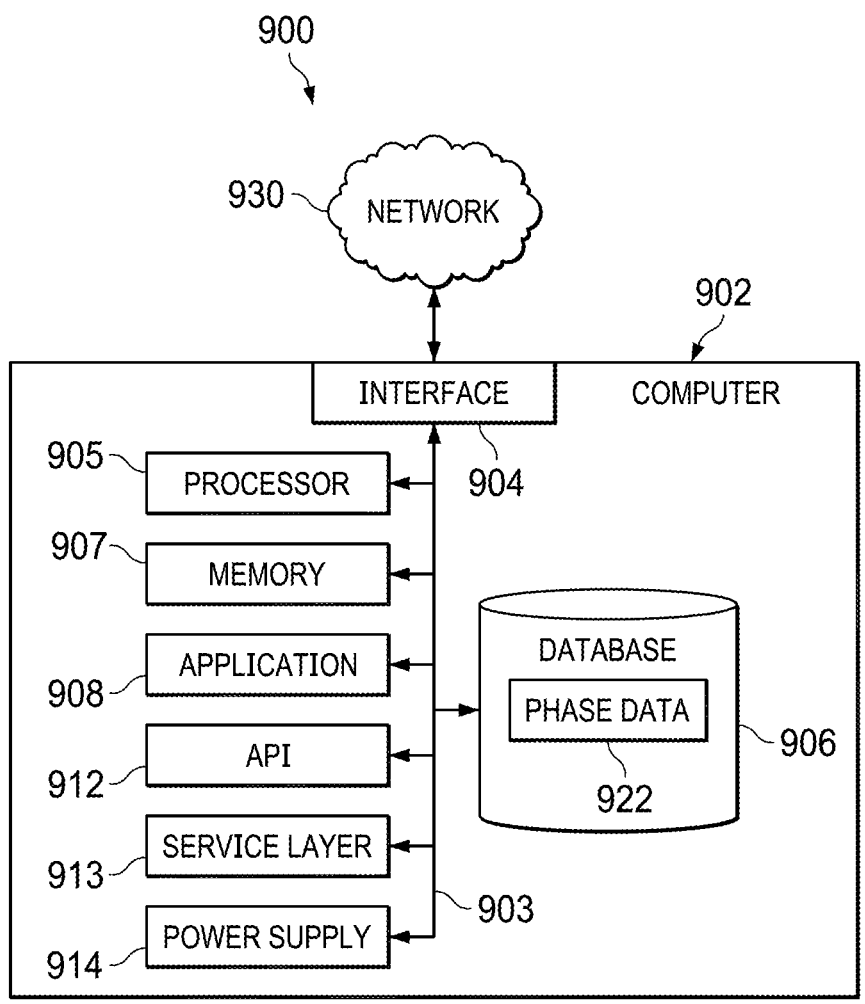
FIG. 9 is a block diagram illustrating an example computer system used to provide computational functionalities associated with described algorithms, methods, functions, processes, flows, and procedures as described in the present specification, according to some implementations of the present specification.

FIG. 9 is a block diagram of an example computer system 900 used to provide computational functionalities associated with described algorithms, methods, functions, processes, flows, and procedures described in the present specification, according to some implementations of the present specification such as the data processing system 800 described in relation to FIG. 8. The illustrated computer 902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI).

The computer 902 can serve in a role as a client, a network component, a server, a database, a persistency, or components of a computer system for performing the subject matter described in the present specification. The illustrated computer 902 is communicably coupled with a network 930. In some implementations, one or more components of the computer 902 can be configured to operate within different environments, including cloud-computing-based environments, local environments, global environments, and combinations of environments.

At a top level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 903. In some implementations, any or all of the components of the computer 902, including hardware or software components, can interface with each other or the interface 904 (or a combination of both) over the system bus 903. Interfaces can use an application programming interface (API) 912, a service layer 913, or a combination of the API 912 and service layer 913. The API 912 can include specifications for routines, data structures, and object classes. The API 912 can be either computer-language independent or dependent. The API 912 can refer to a complete interface, a single function, or a set of APIs.

The service layer 913 can provide software services to the computer 902 and other components (whether illustrated or not) that are communicably coupled to the computer 902. The functionality of the computer 902 can be accessible for all service consumers using this service layer. Software services, such as those provided by the service layer 913, can provide reusable, defined functionalities through a defined interface. For example, the interface can be software written in JAVA, C++, or a language providing data in extensible markup language (XML) format. While illustrated as an integrated component of the computer 902, in alternative implementations, the API 912 or the service layer 913 can be stand-alone components in relation to other components of the computer 902 and other components communicably coupled to the computer 902. Moreover, any or all parts of the API 912 or the service layer 913 can be implemented as child or sub-modules of another software module, enterprise application, or hardware module without departing from the scope of the present specification.

The computer 902 includes an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present specification.

The computer 902 also includes a database 906 that can hold data for the computer 902 (such as phase state data 922 of data stores 802, 820 of FIG. 8) and other components connected to the network 930 (whether illustrated or not). For example, database 906 can be an in-memory, conventional, or a database storing data consistent with the present specification. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present specification. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

The application 908 can be an algorithmic software engine providing functionality according to particular needs, desires, or particular implementations of the computer 902 and the described functionality. For example, application 908 can serve as one or more components, modules, or applications. Further, although illustrated as a single application 908, the application 908 can be implemented as multiple applications 908 on the computer 902. In addition, although illustrated as internal to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system containing computer 902, with each computer 902 communicating over network 930. Further, the terms "client," "user," and other appropriate terminology can be used interchangeably, as appropriate, without departing from the scope of the present specification. Moreover, the present specification contemplates that many users can use one computer 902 and one user can use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present specification contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present specification can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 402.11 a/b/g/n or 402.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the scope of the data processing system described herein. Accordingly, other embodiments are within the scope of the following claims.

What is claimed is:

1. A method for generating a velocity model for a sediment-basement interface of a subsurface region, the method comprising:
   receiving seismic data representing acoustic signals that are reflected from regions of the subsurface;
   receiving potential fields data comprising potential field values that are mapped to locations in the subsurface;
   based on the potential fields data and seismic data, generating weighted time-depth data pairs;
   selecting a velocity model that relates a velocity value to a depth value in a time-depth relationship;
   optimizing velocity coefficients of the velocity model by:
      accessing a set of velocity models;
      determining, for each velocity model, a set of depth estimates for corresponding time values;
      comparing the set of depth estimates to depth values of the weighted time-depth data pairs; and
      based on the comparing, adjusting the velocity coefficients of the velocity model, wherein adjusting the velocity coefficients reduces a difference between the depth estimates and the depth values of the weighted time-depth pairs; and
   generating, using the velocity model having the optimized coefficients, a seismic image of the sediment-basement interface.

2. The method of claim 1, wherein comparing the set of depth estimates to depth values of the weighted time-depth data pairs comprises construction of a visual displaying of a discrepancy map.

3. The method of claim 1, wherein comparing the set of depth estimates to depth values of the weighted time-depth data pairs comprises measuring of an objective function in a parameters space using a set of model candidates.

4. The method of claim 1, wherein the potential fields data comprise at least one of gravimetry data, magnetometry data, and electric resistivity data.

5. The method of claim 1, further comprising:
   receiving well time-depth data from sensors in one or more wells; and
   based on well time-depth data, estimating the coefficients of the velocity model.

6. The method of claim 1, wherein the time-depth relationship is based on a two-way-time (TWT) to a given layer comprising the depth value.

7. The method of claim 1, wherein comparing the set of depth estimates to depth values of the weighted time-depth data pairs comprising performing a Bisquare least squares method.

8. A system for generating a velocity model for a sediment-basement interface of a subsurface region, the system comprising:
   at least one processor; and
   a memory storing instructions that, when executed by the at least one processor, cause the at least one processor to perform operations comprising:
      receiving seismic data representing acoustic signals that are reflected from regions of the subsurface;
      receiving potential fields data comprising potential field values that are mapped to locations in the subsurface;
      based on the potential fields data and seismic data, generating weighted time-depth data pairs;
      selecting a velocity model that relates a velocity value to a depth value in a time-depth relationship;
      optimizing velocity coefficients of the velocity model by:
         accessing a set of velocity models;
         determining, for each velocity model, a set of depth estimates for corresponding time values;
         comparing the set of depth estimates to depth values of the weighted time-depth data pairs; and
         based on the comparing, adjusting the velocity coefficients of the velocity model, wherein adjusting the velocity coefficients reduces a difference between the depth estimates and the depth values of the weighted time-depth pairs; and
      generating, using the velocity model having the optimized coefficients, a seismic image of the sediment-basement interface.

9. The system of claim 8, wherein comparing the set of depth estimates to depth values of the weighted time-depth data pairs comprises construction of a visual displaying of a discrepancy map.

10. The system of claim 8, wherein comparing the set of depth estimates to depth values of the weighted time-depth data pairs comprises measuring of an objective function in a parameters space using a set of model candidates.

11. The system of claim 8, wherein the potential fields data comprise at least one of gravimetry data, magnetometry data, and electric resistivity data.

12. The system of claim 8, further comprising:
receiving well time-depth data from sensors in one or more wells; and
based on well time-depth data, estimating the coefficients of the velocity model.

13. The system of claim 8, wherein the time-depth relationship is based on a two-way-time (TWT) to a given layer comprising the depth value.

14. The system of claim 8, wherein comparing the set of depth estimates to depth values of the weighted time-depth data pairs comprising performing a Bisquare least squares method.

15. One or more non-transitory computer readable media storing instructions for generating a velocity model for a sediment-basement interface of a subsurface region, the instructions, when executed by at least one processor, configured to cause the at least one processor to perform operations comprising:
receiving seismic data representing acoustic signals that are reflected from regions of the subsurface;
receiving potential fields data comprising potential field values that are mapped to locations in the subsurface;
based on the potential fields data and seismic data, generating weighted time-depth data pairs;
selecting a velocity model that relates a velocity value to a depth value in a time-depth relationship;
optimizing velocity coefficients of the velocity model by:
accessing a set of velocity models;
determining, for each velocity model, a set of depth estimates for corresponding time values;
comparing the set of depth estimates to depth values of the weighted time-depth data pairs; and
based on the comparing, adjusting the velocity coefficients of the velocity model, wherein adjusting the velocity coefficients reduces a difference between the depth estimates and the depth values of the weighted time-depth pairs; and
generating, using the velocity model having the optimized coefficients, a seismic image of the sediment-basement interface.

16. The one or more non-transitory computer readable media of claim 15, wherein comparing the set of depth estimates to depth values of the weighted time-depth data pairs comprises construction of a visual displaying of a discrepancy map.

17. The one or more non-transitory computer readable media of claim 15, wherein comparing the set of depth estimates to depth values of the weighted time-depth data pairs comprises measuring of an objective function in a parameters space using a set of model candidates.

18. The one or more non-transitory computer readable media of claim 15, wherein the potential fields data comprise at least one of gravimetry data, magnetometry data, and electric resistivity data.

19. The one or more non-transitory computer readable media of claim 15, further comprising:
receiving well time-depth data from sensors in one or more wells; and
based on well time-depth data, estimating the coefficients of the velocity model.

20. The one or more non-transitory computer readable media of claim 15, wherein the time-depth relationship is based on a two-way-time (TWT) to a given layer comprising the depth value.

* * * * *